(12) United States Patent
Shin

(10) Patent No.: US 10,001,069 B2
(45) Date of Patent: Jun. 19, 2018

(54) METHOD FOR REDUCING EXHAUST GAS OF MILD HYBRID SYSTEM

(71) Applicant: Hyundai Motor Company, Seoul (KR)

(72) Inventor: Buom Sik Shin, Seongnam-si (KR)

(73) Assignee: Hyundai Motor Company, Seoul (KR)

( * ) Notice: Subject to any disclaimer, the term of this patent is extended or adjusted under 35 U.S.C. 154(b) by 26 days.

(21) Appl. No.: 14/973,338

(22) Filed: Dec. 17, 2015

(65) Prior Publication Data

US 2017/0009675 A1    Jan. 12, 2017

(30) Foreign Application Priority Data

Jul. 7, 2015  (KR) .................. 10-2015-0096237

(51) Int. Cl.
| | |
|---|---|
| *F02D 41/00* | (2006.01) |
| *F02D 11/10* | (2006.01) |
| *F02B 39/10* | (2006.01) |
| *F02B 63/04* | (2006.01) |
| *F02M 26/06* | (2016.01) |
| *F02B 37/04* | (2006.01) |
| *F02D 41/04* | (2006.01) |
| *B60W 20/00* | (2016.01) |

(52) U.S. Cl.
CPC ......... *F02D 41/0007* (2013.01); *B60W 20/00* (2013.01); *F02B 37/04* (2013.01); *F02B 39/10* (2013.01); *F02B 63/04* (2013.01); *F02D 11/105* (2013.01); *F02D 41/0052* (2013.01); *F02D 41/045* (2013.01); *F02M 26/06* (2016.02); *F02D 2200/101* (2013.01); *F02D 2200/602* (2013.01); *Y02T 10/144* (2013.01); *Y02T 10/47* (2013.01)

(58) Field of Classification Search
CPC ............... F02D 41/0007; F02D 11/105; F02D 41/0052; F02M 26/06; F02B 39/10; F02B 63/04
USPC ........................................................ 701/110
See application file for complete search history.

(56) References Cited

U.S. PATENT DOCUMENTS

| | | | | |
|---|---|---|---|---|
| 3,257,797 A | * | 6/1966 | Lieberherr | F02B 29/0412 |
| | | | | 123/445 |
| 5,307,783 A | * | 5/1994 | Satoya | F02B 33/446 |
| | | | | 123/559.3 |

(Continued)

FOREIGN PATENT DOCUMENTS

| | | |
|---|---|---|
| JP | 2964617 B2 | 10/1999 |
| JP | 2004-204778 A | 7/2004 |

(Continued)

*Primary Examiner* — Joseph Dallo
*Assistant Examiner* — Yi-Kai Wang
(74) *Attorney, Agent, or Firm* — Morgan, Lewis & Bockius LLP

(57) ABSTRACT

A method for reducing an exhaust gas of a mild hybrid system may include determining by an electronic control unit (ECU) whether an engine enters a full load region or a partial load region, based on a position of an accelerator pedal, controlling, by the ECU, the operation of an electric supercharger, based on information on an engine rotational frequency, when a vehicle is driven while being accelerated in a state in which the engine enters the full load region, and controlling, by the ECU, the operation of the electric supercharger by determining whether the vehicle is accelerated, based on an incremental slope of the position of the accelerator pedal, when the engine enters the partial load region.

11 Claims, 2 Drawing Sheets

(56) References Cited

U.S. PATENT DOCUMENTS

| | | | | |
|---|---|---|---|---|
| 5,615,554 | A * | 4/1997 | Gobert | F02B 33/44 |
| | | | | 181/249 |
| 8,001,779 | B2 | 8/2011 | Styles | |
| 9,010,114 | B2 * | 4/2015 | Krug | F02B 29/0412 |
| | | | | 60/605.1 |
| 2004/0194466 | A1 * | 10/2004 | Kawamura | F02B 33/34 |
| | | | | 60/612 |
| 2007/0051349 | A1 * | 3/2007 | Marumoto | F02B 33/34 |
| | | | | 123/565 |
| 2012/0060486 | A1 * | 3/2012 | Yamada | F16H 61/0025 |
| | | | | 60/459 |
| 2013/0255251 | A1 * | 10/2013 | Tanaka | F02B 39/10 |
| | | | | 60/605.2 |
| 2013/0261938 | A1 * | 10/2013 | Ogata | F02D 29/06 |
| | | | | 701/105 |
| 2014/0007574 | A1 | 1/2014 | Pegg et al. | |
| 2015/0369179 | A1 * | 12/2015 | Hotta | F02D 41/0065 |
| | | | | 123/568.12 |
| 2016/0084206 | A1 * | 3/2016 | Noda | F02D 41/10 |
| | | | | 123/568.21 |
| 2017/0009675 | A1 * | 1/2017 | Shin | F02D 41/0007 |

FOREIGN PATENT DOCUMENTS

| | | |
|---|---|---|
| JP | 3783712 B2 | 6/2006 |
| JP | 2009-35122 A | 2/2009 |
| JP | 2009-222007 A | 10/2009 |
| JP | 2010-14072 A | 1/2010 |
| JP | 2010-18212 A | 1/2010 |
| JP | 2010-174859 A | 8/2010 |
| JP | 2013-132920 A | 7/2013 |
| JP | 2013-181394 A | 9/2013 |

* cited by examiner

METHOD FOR REDUCING EXHAUST GAS OF MILD HYBRID SYSTEM

CROSS-REFERENCE TO RELATED APPLICATION

The present application claims priority to Korean Patent Application No. 10-2015-0096237 filed Jul. 7, 2015, the entire contents of which is incorporated herein for all purposes by this reference.

BACKGROUND OF THE INVENTION

Field of the Invention

The present invention relates to a method for reducing an exhaust gas of a mild hybrid system. More particularly, it relates to a method for reducing an exhaust gas of a mild hybrid system, which can reduce an exhaust gas generated in sudden acceleration of a vehicle equipped with an electric supercharger as a supercharger for pressurizing air and supplying the pressurized air to an engine.

Description of Related Art

In general, after introducing external air, a vehicle mixes the air with a fuel to supply the mixture to an engine, and the engine combusts the mixture of the fuel and the air to obtain power necessary to drive the vehicle.

In a process of generating the power by driving of the engine, a desired output and combustion efficiency of the engine is obtained only when the external air is to be sufficiently supplied for combustion. Accordingly, in order to improve the combustion efficiency of the engine and increase the output of the engine, a supercharger or a turbocharger for pressurizing and supplying combustion air has been applied to the vehicle.

The turbocharger has a structure compressing air supplied to the engine by using the pressure of an exhaust gas exhausted from the engine. More specifically, the turbocharger has a structure rotating a turbine by using the pressure of an exhaust gas exhausted from the engine and compressing external air introduced through an intake filter as a compressor coaxially connected to the turbine, thereby supplying the compressed air to a combustion chamber of the engine.

However, there is a limitation in compressing intake air with only the pressure of an exhaust gas and supplying the compressed intake air to the engine according to a driving situation of the vehicle.

For example, when an engine load is increased and the amount of acceleration is rapidly increased due to transient operation in driving of the vehicle, the supercharging of the turbocharger should be made according to the transient operation. However, the turbocharger is operated only when the turbine is rotated by the pressure of the exhaust gas, and therefore, a turbo lag (turbo response delay) phenomenon occurs.

Accordingly, it is difficult for the turbocharger to achieve a desired supercharging function as compared with the increase in the engine load and the rapid acceleration. Hence, a supercharging pressure and an air amount for combustion of the engine are deficient as compared with target amounts, and therefore, the combustion of the engine deteriorates. Also, as an air amount for exhaust gas recirculation (EGR) control is deficient as compared with a target amount, an EGR valve for supplying the exhaust gas to the front end of the turbocharger is closed, and hence the recirculation of the exhaust gas is not made. Accordingly, the amount of the exhaust gas increases, and the amount of nitrogen oxide contained in the exhaust gas is maximally generated. Therefore, the air pollution becomes severe.

The information disclosed in this background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method for reducing an exhaust gas of a mild hybrid system, which can prevent a turbo lag phenomenon caused in rapid acceleration of a vehicle, increase the output of an engine by supercharging the target amount of a supercharging pressure and an air, and promote smooth recirculation of an exhaust gas by sufficiently securing an air amount for exhaust gas recirculation (EGR) control.

According to various aspects of the present invention, a method for reducing an exhaust gas of a mild hybrid system may include a) determining by an electronic control unit (ECU) whether an engine enters a full load region or a partial load region, based on a position of an accelerator pedal, b) controlling, by the ECU, the operation of an electric supercharger, based on information on an engine rotational frequency, when a vehicle is driven while being accelerated in a state in which the engine enters the full load region, and c) controlling, by the ECU, the operation of the electric supercharger by determining whether the vehicle is accelerated, based on an incremental slope of the position of the accelerator pedal, when the engine enters the partial load region.

In step a), it may be determined that, when the position of the accelerator pedal is 100%, the vehicle is driven while being accelerated in the state in which the engine enters the full load region, and it may be determined that, when the position of the accelerator pedal is less than 100%, the engine enters the partial load region.

In step b), when the engine rotational frequency is equal to or smaller than a predetermined reference rotational frequency when the vehicle is driven while being accelerated in the state in which the engine enters the full load region, the electric supercharger may be operated.

In step b), when the engine rotational frequency is equal to or smaller than the predetermined reference rotational frequency when the vehicle is driven while being accelerated in the state in which the engine enters the full load region, the electric supercharger may be operated, and a motor output may be added to an engine output by operating a motor of a generator integrated motor, thereby increasing a system output.

In step c), when it is determined that the vehicle is being accelerated in a state in which the engine enters the partial load region, a negative pressure may be formed at a rear end of a low-pressure exhaust gas recirculation (LP-EGR) valve by operating the electric supercharger.

In step c), when it is determined that the vehicle is being accelerated in a state in which the engine enters the partial load region, a negative pressure may be formed at a rear end of an LP-EGR valve by operating the electric supercharger, and when it is determined that the vehicle reaches a non-acceleration state during the operation of the electric supercharger, the operation of the electric supercharger may be stopped.

In step c), when it is determined that the vehicle is being accelerated in a state in which the engine enters the partial load region, a negative pressure may be formed at a rear end of an LP-EGR valve by operating the electric supercharger, and a driving load of the engine may be reduced by operating a motor of a generator integrated motor.

In step c), it may be determined whether the vehicle is accelerated by comparing the incremental slope of the position of the accelerator pedal with a previously set reference value, and when the incremental slope of the position of the accelerator pedal is equal to or greater than the reference value, it may be determined that the vehicle is in an acceleration state, and when the incremental slope of the position of the accelerator pedal is equal to or smaller than the reference value, it may be determined that the vehicle is in a non-acceleration state.

In the method according to the present invention, the operation of the electric supercharger and the LP-EGR is optimized by determining whether the vehicle is accelerated according to a driving load condition of the engine, so that it is possible to prevent boost formation from being delayed due to the conventional turbo lag. Further, a negative pressure is instantaneously formed at the rear end of the LP-EGR valve so as to operate the LP-EGR, so that it is possible to minimize the use of the throttle valve at the intake side or the back pressure adjusting valve at the exhaust side so as to form a pressure difference between the exhaust recirculation side and the engine intake side, thereby improving the efficiency of the engine.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In the present invention, in order to prevent a problem caused when it is difficult for a turbocharger to achieve a supercharging function required in an engine as a turbo lag phenomenon occurs in transient driving such as sudden acceleration of a vehicle, an electric supercharger equipped in the vehicle is operated through operation control of a mild hybrid system using the electric supercharger as a main component, thereby preventing the occurrence of a turbo lag during the transient driving. Accordingly, it is possible to promote smooth recirculation of an exhaust gas through exhaust gas recirculation (EGR), thereby reducing the exhaust gas.

Figure 1:
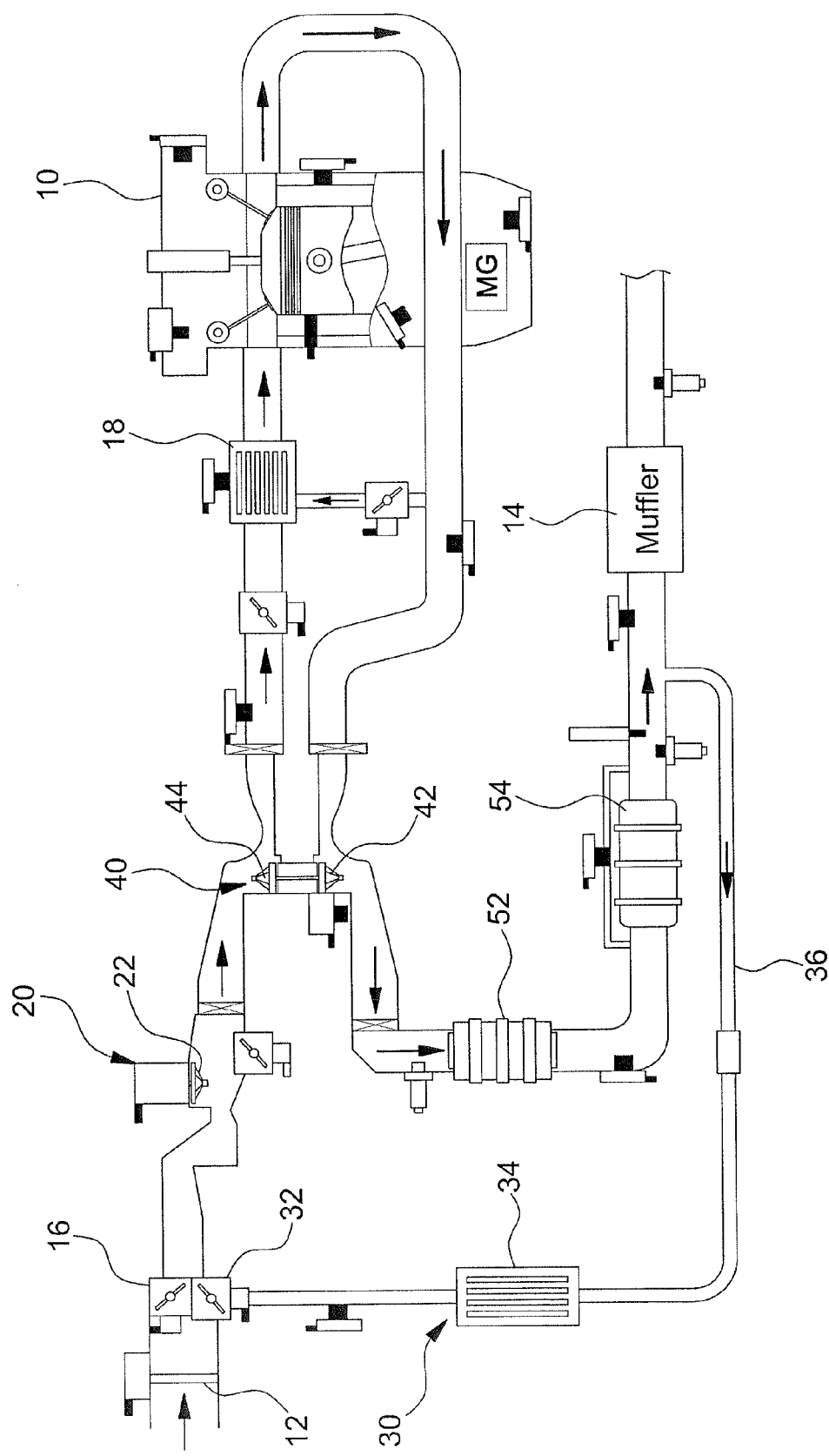
FIG. 1 is a configuration view illustrating a mild hybrid system to which an exemplary method for reducing an exhaust gas of the mild hybrid system is applied according to the present invention.

FIG. 1 illustrates a configuration of a mild hybrid system using an electric supercharger as a main component.

As shown in FIG. 1, the mild hybrid system includes a motor integrated generator (or generator integrated motor) (MG), an electric supercharger 20, and a low pressure exhaust gas recirculation (LP-EGR) 30.

The generator integrated motor is a device in which a motor and a generator are integrally formed to perform two functions of the motor and the generator. The generator integrated motor (MG) is advantageous to secure a mounting space in a small engine. For this reason, the output of electric energy is limited to a certain value or less, and therefore, the generator integrated motor (MG) does not constitute a full hybrid system having a large capacity but constitutes a mild hybrid system.

The generator integrated motor (MG) additionally increases a system output by driving the motor when the accelerator pedal position is depressed (opened) 100%, and instantaneously decreases an engine load by driving the motor when the accelerator pedal position is not depressed (opened) 100%.

Also, the generator integrated motor (MG) is based on a high voltage (e.g., 48V). When a voltage is increased, the generator integrated motor (MG) can receive or supply electric energy without increasing the diameter of an electric wire, which is advantageous in terms of energy efficiency.

The electric supercharger 20 compresses intake air by driving a compressor 22 using a separate electric motor and supplies the compressed intake air to a combustion chamber of the engine 10. Thus, it is possible to improve the responsiveness of an engine 10 in a turbo lag period in which the operation of a turbocharger 40 is delayed.

That is, the mild hybrid system uses the supercharger 20 in an electric drive manner instead of a mechanical manner by considering the responsiveness of the engine 10 in sudden acceleration of a vehicle.

The electric supercharger 20 is located at the rear end of an LP-EGR valve 32 disposed between the front end of a compressor 44 of the turbocharger 40 and the rear end of an intake filter 12. This is because a negative pressure for operating the LP-EGR valve 32 disposed at the rear end of the intake filter 12 is formed, and the temperature and pressure of an exhaust gas recirculated by passing through an LP-EGR cooler 34 are low, thereby improving the efficiency of the supercharger 20.

The LP-EGR 30 recirculates an exhaust gas passing through a turbine 42 of the turbocharger 40 and an exhaust post-processing device (a diesel oxidation catalyst (DOC) 52 and a diesel particulate filter (DPF) 54) and mixes the exhaust gas with the intake air supplied to the engine 10, so that the temperature of the combustion chamber of the engine 10 is lowered, thereby reducing exhaust gas and nitrogen oxide (NOx). The LP-EGR 30 is configured to reduce exhaust gas of a diesel engine or lean burn engine which requires reduction in exhaust gas and nitrogen oxide.

In an engine performing combustion according to a stoichiometric ratio, a three-way catalyst reduces exhaust gas. However, the purification rate of the three-way catalyst is not high in a lean condition, and therefore, it is required to reduce nitrogen oxide.

For reference, a case where the amount of fuel is less than that at the stoichiometric ratio representing an appropriate ratio of air and fuel for combustion is referred to as a lean state, and an engine burning a mixture in the lean state is referred to as a lean burn engine.

That is, the lean burn engine refers to an engine in which, in a mixture (fuel+air) introduced into a combustion chamber of the engine, the percentage of the air is increased and the percentage of the fuel is decreased with respect to a ratio of air to fuel, thereby improving fuel efficiency.

The three-way catalyst is one of exhaust gas purifying devices for a reducing process of separating oxygen from nitrogen oxide (NOx) and changing the nitrogen oxide into harmless nitrogen (N2) or oxygen (O2), and refers to a catalyst converter using platinum, palladium, etc. The three-way catalyst maintains a mixture at the stoichiometric ratio, so that any oxygen is not left in exhaust air.

Figure 2:
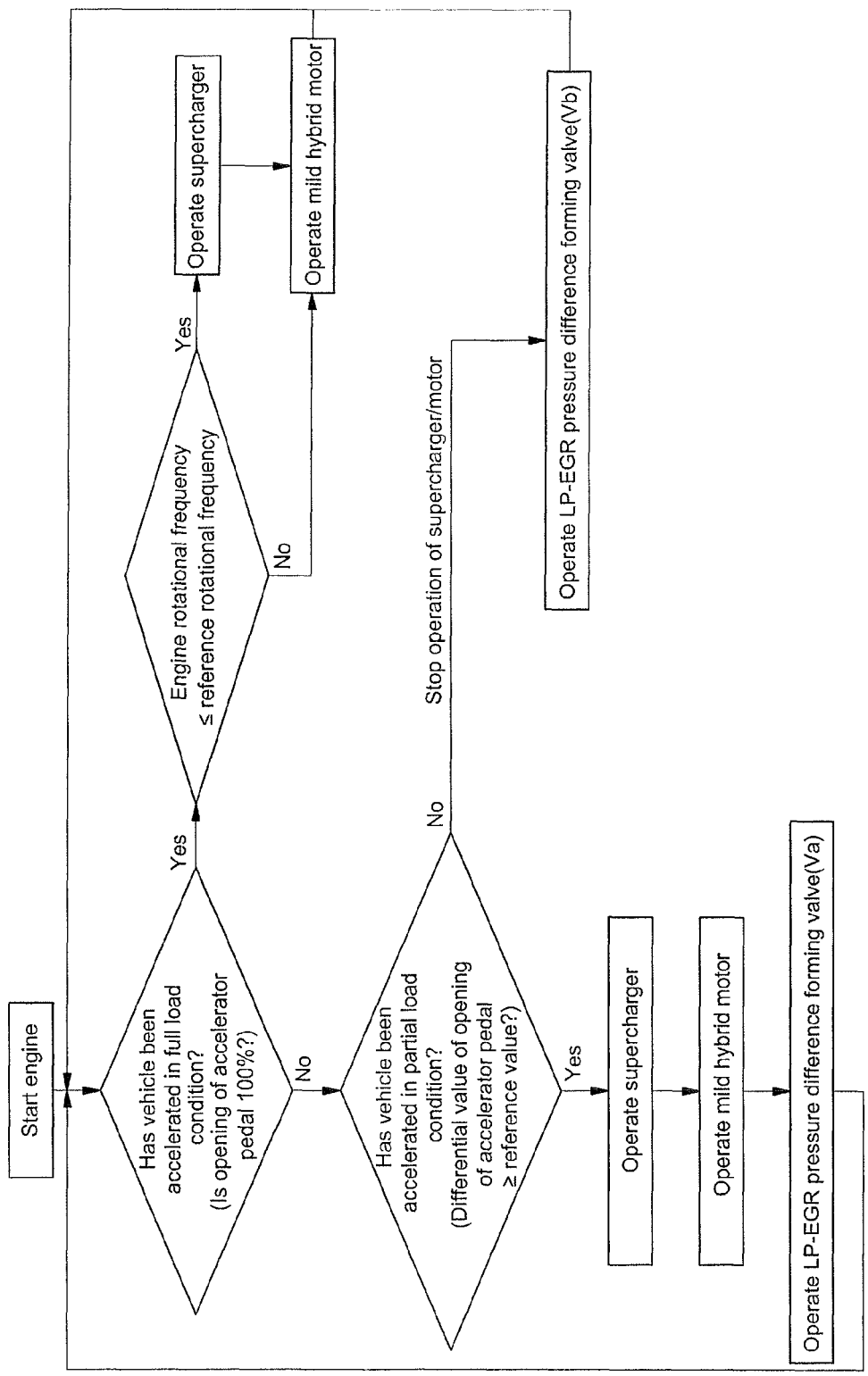
FIG. 2 is a flowchart illustrating the exemplary method for reducing an exhaust gas of the mild hybrid system according to the present invention.

Here, a method for reducing exhaust gas of the mild hybrid system configured as described above will be described as follows with reference to FIG. 2.

First, if it is determined that the accelerator pedal position is 100% as a driver fully pushes the accelerator pedal to accelerate the vehicle without considering fuel efficiency, the vehicle is driven while being accelerated in a state in which the engine 10 enters a full load region or a wide open throttle (WOT) region as a throttle valve 16 is fully opened accelerator pedal position is 100%.

When the engine enters the full load region as the accelerator pedal is opened to 100% the accelerator pedal position is 100%, it is determined that the vehicle is driven while being accelerated.

It may be determined whether supercharging pressure is sufficiently formed by the turbocharger 40, i.e., whether supercharging pressure required in driving of the engine is formed by the turbocharger 40, based on an engine rotational frequency detected when the vehicle is driven while being accelerated in the state in which the engine 10 enters the full load region.

Specifically, if the engine rotational frequency is generated greater than a predetermined value (reference rotational frequency), the pressure and temperature of an exhaust gas exhausted from the engine are high, and therefore, the supercharging pressure formed and supplied by the turbocharger 40 reaches a target value (supercharging pressure is not necessary for driving of the engine). If the engine rotational frequency is generated smaller than the predetermined value (reference rotational frequency), the pressure and temperature of an exhaust gas exhausted from the engine are low, and therefore, the supercharging pressure formed and supplied by the turbocharger 40 is less than the target value (supercharging pressure necessary for driving of the engine).

Thus, an electronic control unit (ECU) controlling the operation of the electric supercharger 20 controls the operation of the electric supercharger 20, based on information on the engine rotational frequency detected when the vehicle is driven while being accelerated in the state in which the engine 10 enters the full load region. If it is determined that the detected engine rotational frequency is equal to or smaller than the reference rotational frequency, the ECU determines that the pressure and temperature of the exhaust gas are low, and therefore, the supercharging pressure formed by the turbocharger 40 is less than the target value, thereby operating the electric supercharger 20. If it is determined that the detected engine rotational frequency is equal to or greater than the reference rotational frequency, the ECU determines that the pressure and temperature of the exhaust gas are high, and therefore, the supercharging pressure formed by the turbocharger 40 reaches the target value, thereby not operating the electric supercharger 20.

That is, if it is determined that the detected engine rotational frequency is an engine rotational frequency where the pressure and temperature of the exhaust gas are low, and therefore, the supercharging pressure formed by the turbocharger 40 is less than the target value, the ECU operates the electric supercharger 20. If it is determined that the detected engine rotational frequency is an engine rotational frequency where the pressure and temperature of the exhaust gas are sufficiently high, and therefore, the supercharging pressure formed by the turbocharger 40 is appropriate, the ECU does not operate the electric supercharger 20.

Here, the reference rotational frequency is an engine rotational frequency when the supercharging pressure supplied to the engine by the turbocharger reaches the target value necessary for driving of the engine. The reference rotational frequency is determined as a generally known value or a value derived by a previous experiment, evaluation, etc. in a vehicle condition.

In this case, the generator integrated motor (MG) increases an acceleration force of the vehicle by additionally increasing a system output as the motor (or a mild hybrid motor) is operated regardless of the operation of the electric supercharger 20. The generator integrated motor (MG) is continuously operated up to a limitation in supply electricity to a battery in the vehicle, thereby maximizing the acceleration force of the vehicle.

Here, the operation of the generator integrated motor (MG) may be controlled by the ECU controlling the operation of the electric supercharger 20.

The mild hybrid system in the conditions forms an output obtained by adding up an output of the engine 10 driven by receiving the supercharging pressure by the turbocharger 40, an output of the engine 10 driven using fuel additionally injected through the supply of the supercharging pressure by the electric supercharger 20, and an output of the generator integrated motor (MG).

Meanwhile, if it is determined that the driver allows the accelerator pedal to be positioned to less than 100% by pushing the accelerator pedal so as to drive the vehicle in a condition where the driver intends to accelerate the vehicle but importantly considers fuel efficiency, exhaust gas, etc., the ECU determines that the engine 10 enters a partial load region or a partial open throttle region as the throttle valve 16 accelerator pedal position is partial state. The position is lower than 100%.

When the engine 10 enters into the partial load region, the ECU determines whether the vehicle is accelerated based on a value obtained by differentiating the position of the accelerator pedal (i.e., an incremental slope of the position of the accelerator pedal), and compares the differential value (incremental slope) of the position of the accelerator pedal with a previously set reference value. If the differential value is equal to or greater than the reference value, the ECU determines that the vehicle is in an acceleration state. If the differential value is equal to or smaller than the reference value, the ECU determines that the vehicle is not in the acceleration state.

Here, the reference value refers to an incremental slope of the position of the accelerator pedal when the vehicle is in the acceleration state. The reference value is determined as a generally known value or a value derived by a previous experiment, evaluation, etc. in a vehicle condition.

If it is determined that the differential value of the position of the accelerator pedal is equal to or greater than the reference value in the state in which the engine 10 enters the partial load region, the ECU controlling the operation of the electric supercharger 20 is to perform an operation by considering improvement of fuel efficiency and reduction in exhaust gas. Thus, the ECU effectively operates the LP-EGR 30 so as to prevent an increase in exhaust gas and nitrogen oxide in acceleration of the vehicle.

When the vehicle is accelerated in the state in which the engine 10 enters into the partial load region, the ECU operates the electric supercharger 20 so as to instantaneously operate the LP EGR 30. This is provided for the purpose of rapidly rotating the compressor 22 of the electric supercharger 20 by operating the electric supercharger 20 located at the rear end of the LP-EGR valve 32, so that a negative pressure is formed at the rear end of the LP-EGR valve 32 (or the front end of the LP-EGR 30), thereby rapidly introducing the exhaust gas at the rear end of the DPF 54 into the intake air of the engine.

In the LP-EGR 30, the LP-EGR cooler 34 for cooling the recirculated exhaust gas is located in an exhaust recirculation line 36 connected in a branched form between the DPF 54 and a muffler 14, and the LP-EGR valve 32 for recirculating the exhaust gas toward the intake air is located at a final portion of the exhaust recirculation line 36. In the LP-EGR 30, a pressure difference between the front end and rear end of the LP-EGR valve 32 is formed in a state in which the LP-EGR valve 32 is opened, thereby recirculating the exhaust gas.

Conventionally, there was provided a structure in which an exhaust gas was recirculated when an LP-EGR valve is opened by forming a pressure difference between the intake side and exhaust recirculation side of the engine due to an increase in back pressure through a back pressure adjusting valve located at the exhaust side of the engine without operating the electric supercharger, or by forming a pressure difference between the intake side and exhaust recirculate side of the engine due to opening/closing of a throttle valve located at the intake side of the engine.

However, in the conventional structure, the exhaust gas is recirculated by closing a valve for forming a pressure difference between the intake side and the exhaust recirculation side. Therefore, flow loss occurs due to the recirculation of the exhaust gas, thereby resulting in deterioration of fuel efficiency.

On the other hand, in the present invention, when the exhaust gas is recirculated by operating the electric supercharger 20, a negative pressure is formed at the rear end of the LP-EGR valve 32 by operating the electric supercharger 20, to recirculate the exhaust gas through the opened LP-EGR valve 32. Simultaneously, the supercharging pressure supplied to the engine 10 is increased at the rear end of an intercooler 18. Thus, the method according to the present invention is efficiency as compared with the conventional method described above.

However, when the exhaust gas is recirculated by operating the electric supercharger 20, electric energy is to be supplied from the battery in the vehicle so as to rotatably operate the compressor 22 of the electric supercharger 20. Therefore, the use of the electric supercharger 20 for a long period of time causes deterioration of fuel efficiency.

Thus, if it is determined that the incremental slope (differential value) of the position of the accelerator pedal is decreased during the operation of the electric supercharger 20 and hence reaches the reference value or less, i.e., if it is determined that the vehicle reaches a non-acceleration state during the operation of the electric supercharger 20 and hence is not in the acceleration state, the ECU stops the operation of the electric supercharger 20 and operates only the LP-EGR valve 32 and a pressure difference forming valve (valve for forming a pressure difference between the exhaust recirculation side and the engine intake side). This is because, if the vehicle reaches the non-acceleration state, the generation of exhaust gas and nitrogen oxide is decreased as compared with that in the acceleration state of the vehicle.

That is, if it is determined that the vehicle is not in the acceleration state by comparing the differential value of the position of the accelerator pedal with the reference value, the ECU stops the operation of the electric supercharger 20 and the generator integrated motor (MG) and operates only the pressure difference forming valve and the LP-EGR valve 32.

Here, the pressure difference forming valve may be the throttle valve 16 installed at the engine intake side or the back pressure adjusting valve (not shown) installed at the front end of the muffler 14 so as to form a back pressure for operating the LP-EGR 30.

In an LP-EGR flow with the same flow rate, the opening (or position) of the pressure difference forming valve in an acceleration condition of the vehicle is formed relatively smaller than the opening (or position) of the pressure difference forming valve in a non-acceleration condition. This is because a negative pressure is formed at the rear end of the LP-EGR valve 32 by the operation of the electric supercharger 20 in the acceleration condition.

That is, by operating the electric supercharger 20 in the acceleration condition, Va is equal to or smaller than Vb in a condition where an exhaust gas with the same flow rate is recirculated. On the contrary, the flow rate of the recirculated exhaust gas can be further increased in a condition where the Va is equal to the Vb. Thus, it is effective to decrease an instantaneous maximum value of nitrogen oxide.

The Va is an opening (position) of the pressure difference forming valve for recirculating the exhaust gas in an excessive sudden acceleration condition, and the Vb is an opening (position) of the pressure difference forming valve for recirculating the exhaust gas in a constant speed condition.

Thus, the opening of the pressure difference forming valve is Vb when the electric supercharger 20 is not operated, and the opening of the pressure difference forming valve is Va when the electric supercharger 20 is operated and then stopped. The Va is equal to or smaller than the Vb in the condition where the exhaust gas with the same flow rate is recirculated, and the flow rate of the recirculated exhaust gas can be further increased in the condition where the Va is equal to the Vb. That is, the exhaust gas can be sufficiently recirculated in a state in which the pressure difference forming valve is closed a little (a state in which the throttle valve 16 is closed a little or a state in which the back pressure adjusting valve at the front end of the muffler 14 is closed a little).

When the vehicle is accelerated in the state in which the engine enters the partial load region, the generator integrated motor (MG) is instantaneously operated. This is not provided for the purpose of generating an additional acceleration force by additionally increasing a system output but provided for the purpose of lowering a driving load of the engine by reducing a load that the engine output occupies in a driver's desired acceleration force. If the load of the engine is lowered, fuel burned in the engine is reduced, thereby inducing reduction in exhaust gas and nitrogen oxide.

In this case, a driver acceleration output required as the driver pushes the accelerator pedal becomes the sum of an output of the engine and an output of the generator integrated motor (MG).

However, when the generator integrated motor (MG) is continuously used, electric energy required to drive the motor is to be supplied from the battery in the vehicle, and hence the fuel efficiency may deteriorate. Therefore, the ECU drives the generator integrated motor (MG) for a short period of time. If the vehicle enters an acceleration condition equal to or smaller than a predetermined value, i.e., a condition where it is determined that the vehicle is not in the acceleration state (a condition where the incremental slope of the position of the accelerator pedal is equal to or smaller than the reference value), the ECU stops the operation of the motor.

Thus, as described above, if it is determined that the vehicle is not in the acceleration state by comparing the differential value (incremental slope) of the position of the accelerator pedal with a previously set reference value when the engine enters the partial load region, the ECU stops the operation of the electric supercharger 20 and the motor (generator integrated motor (MG)) and operates only the LP-EGR valve 32 and the pressure difference forming valve.

In this case, the pressure difference forming valve is opened with an opening (position) for recirculating the exhaust gas in a constant speed driving condition.

As described above, in the present invention, the operation of the electric supercharger and the LP-EGR is optimized by determining whether the vehicle is accelerated according to a driving load condition of the engine, so that it is possible to prevent boost formation from being delayed due to the conventional turbo lag. Further, a negative pressure is instantaneously formed at the rear end of the LP-EGR valve so as to operate the LP-EGR, so that it is possible to minimize the use of the throttle valve at the intake side or the back pressure adjusting valve at the exhaust side so as to form a pressure difference between the exhaust recirculation side and the engine intake side, thereby improving the efficiency of the engine.

Also, in the present invention, the electric supercharger and the generator integrated motor (MG), which are operated by receiving electric energy supplied from the battery in the vehicle, are instantaneously operated for a short period of time so as to improve the entire energy efficiency of the engine. Thus, it is possible to prevent the deterioration of fuel efficiency and optimize the use of energy.

In addition, in the present invention, it is expected that a response of the compressor of the electric supercharger will be delayed as compared with that of the generator integrated motor (MG), so that the electric supercharger is operated earlier than the generator integrated motor (MG).

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for reducing an exhaust gas of a mild hybrid system, the method comprising:
    a) determining by an electronic control unit (ECU) whether an engine enters a full load region or a partial load region, based on a position of an accelerator pedal;
    b) controlling, by the ECU, the operation of an electric supercharger, based on information on an engine rotational frequency, when a vehicle is driven while being accelerated in a state in which the engine enters the full load region; and
    c) controlling, by the ECU, the operation of the electric supercharger by determining whether the vehicle is accelerated, based on an incremental slope of the position of the accelerator pedal, when the engine enters the partial load region,
    wherein the electric supercharger is located between downstream of a low-pressure exhaust gas recirculation (LP-EGR) valve and upstream of a compressor of a turbocharger, and
    wherein a negative pressure is formed at downstream of the low-pressure exhaust gas recirculation (LP-EGR) valve by operating the electric supercharger, to recirculate an exhaust gas through the LP-EGR valve and simultaneously, a supercharging pressure supplied to the engine is increased at upstream of an intercooler, thereby preventing an occurrence of a turbo lag of the turbocharger during a transient driving.

2. The method of claim 1, wherein, in step a), it is determined that, when the position of the accelerator pedal is 100%, the vehicle is driven while being accelerated in the state in which the engine enters the full load region, and it is determined that, when the position of the accelerator pedal is less than 100%, the engine enters the partial load region.

3. The method of claim 1, wherein, in step b), when the engine rotational frequency is equal to or smaller than a predetermined reference rotational frequency when the vehicle is driven while being accelerated in the state in which the engine enters the full load region, the electric supercharger is operated.

4. The method of claim 1, wherein, in step b), when the engine rotational frequency is equal to or smaller the predetermined reference rotational frequency when the vehicle is driven while being accelerated in the state in which the engine enters the full load region, the electric supercharger is operated, and a motor output is added to an engine output by operating a motor of a generator integrated motor, thereby increasing a system output.

5. The method of claim 1, wherein, in step c), when it is determined that the vehicle is being accelerated in a state in which the engine enters the partial load region, a negative pressure is formed at downstream of a low-pressure exhaust gas recirculation (LP-EGR) valve by operating the electric supercharger.

6. The method of claim 1, wherein, in step c), when it is determined that the vehicle is being accelerated in a state in which the engine enters the partial load region, a negative pressure is formed at downstream of an LP-EGR valve by operating the electric supercharger, and when it is determined that the vehicle reaches a non-acceleration state during the operation of the electric supercharger, the operation of the electric supercharger is stopped.

7. The method of claim 1, wherein, in step c), when it is determined that the vehicle is being accelerated in a state in which the engine enters the partial load region, a negative pressure is formed at downstream of an LP-EGR valve by operating the electric supercharger, and a driving load of the engine is reduced by operating a motor of a generator integrated motor.

8. The method of claim 1, wherein, in step c), it is determined whether the vehicle is accelerated by comparing the incremental slope of the position of the accelerator pedal with a previously set reference value, and wherein, when the incremental slope of the position of the accelerator pedal is equal to or greater than the reference value, it is determined that the vehicle is in an acceleration state, and when the incremental slope of the position of the accelerator pedal is equal to or smaller than the reference value, it is determined that the vehicle is in a non-acceleration state.

9. A method for reducing an exhaust gas of a mild hybrid system, the method comprising:
   a) determining by an electronic control unit (ECU) whether an engine enters a full load region or a partial load region, based on a position of an accelerator pedal;
   b) controlling, by the ECU, the operation of an electric supercharger, based on information on an engine rotational frequency, when a vehicle is driven while being accelerated in a state in which the engine enters the full load region; and
   c) controlling, by the ECU, the operation of the electric supercharger by determining whether the vehicle is accelerated, based on an incremental slope of the position of the accelerator pedal, when the engine enters the partial load region, wherein, when it is determined that the vehicle is being accelerated in a state in which the engine enters the partial load region, a negative pressure is formed at downstream of a low-pressure exhaust gas recirculation (LP-EGR) valve by operating the electric supercharger which is located downstream of the LP-EGR valve disposed between upstream of a compressor of a turbocharger and downstream of an intake filter, thereby preventing an occurrence of a turbo lag of the turbocharger during a transient driving.

10. A method for reducing an exhaust gas of a mild hybrid system, the method comprising:
    a) determining by an electronic control unit (ECU) whether an engine enters a full load region or a partial load region, based on a position of an accelerator pedal;
    b) controlling, by the ECU, an operation of an electric supercharger, based on information on an engine rotational frequency, when a vehicle is driven while being accelerated in a state in which the engine enters the full load region; and
    c) controlling, by the ECU, the operation of the electric supercharger by determining whether the vehicle is accelerated, based on an incremental slope of the position of the accelerator pedal, when the engine enters the partial load region,
    wherein, when the vehicle is accelerated in a state in which the engine enters into the partial load region, the electric supercharger is operated, by the ECU, to instantaneously operate a low-pressure exhaust gas recirculation (LP EGR) thereby rapidly rotating a compressor of the electric supercharger by operating the electric supercharger located downstream of a low-pressure exhaust gas recirculation (LP-EGR) valve, so that a negative pressure is formed at downstream of the LP-EGR valve, thereby rapidly introducing the exhaust gas at upstream of a diesel particulate filter (DPF) into an intake air of the engine.

11. The method of claim 1, wherein, in step c), wherein, when it is determined that the incremental slope of the position of the accelerator pedal is decreased during the operation of the electric supercharger and hence reaches a reference value or less, the ECU stops the operation of the electric supercharger and operates only the LP-EGR valve and a pressure difference forming valve which is a valve for forming a pressure difference between an exhaust recirculation side and an engine intake side.

* * * * *